Sept. 30, 1930.  I. E. LANHOFFER ET AL  1,777,043
APPARATUS FOR CONVEYING POWDERED MATERIALS IN PIPES
Filed Oct. 29, 1925  2 Sheets-Sheet 1
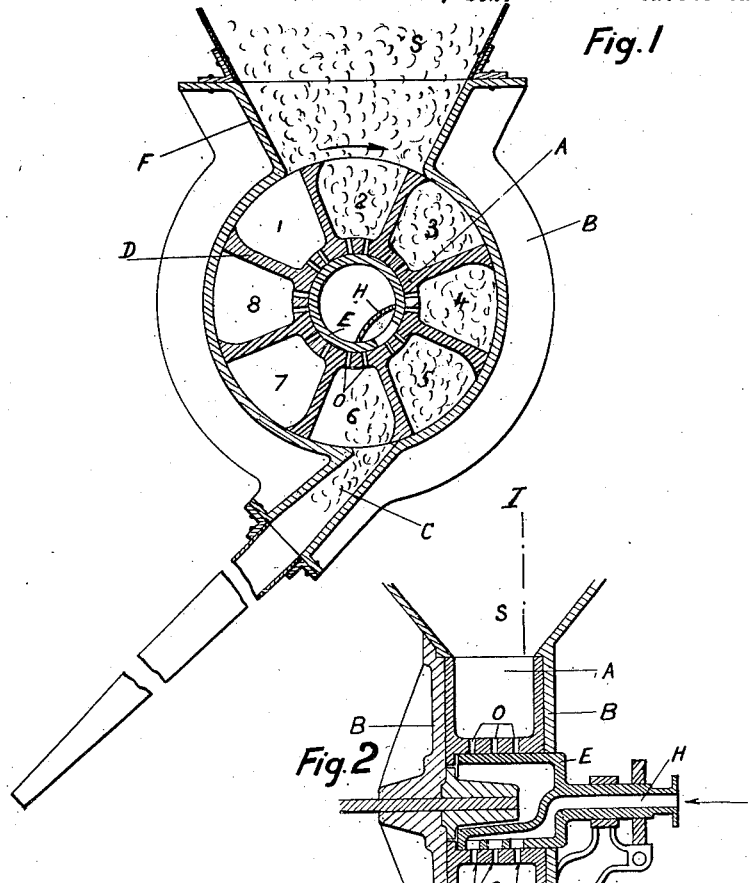
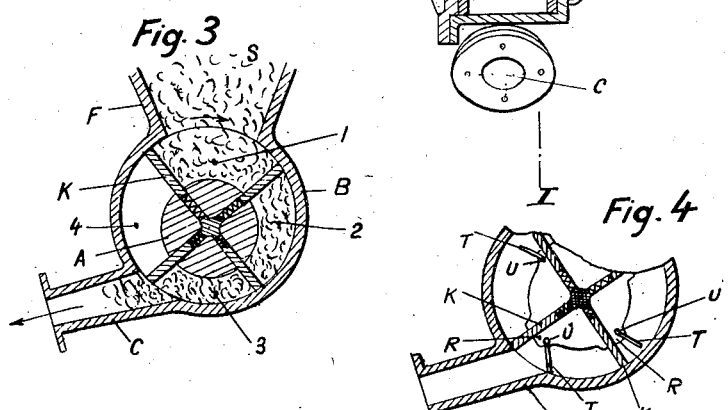
Inventors:-
Ivan Emile Lanhoffer and
Edmond Lanhoffer
by attorneys

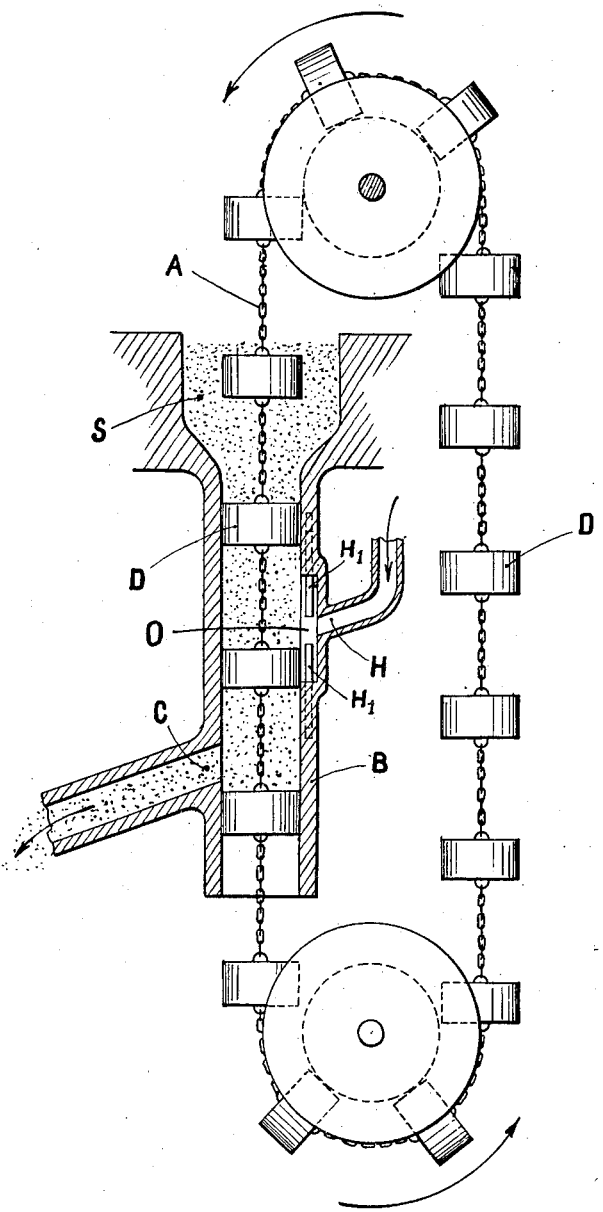

Patented Sept. 30, 1930

1,777,043

UNITED STATES PATENT OFFICE

IVAN EMILE LANHOFFER AND EDMOND LANHOFFER, OF PARIS, FRANCE, ASSIGNORS, BY DIRECT AND MESNE ASSIGNMENTS, TO FULLER COMPANY, OF CATASAUQUA, PENNSYLVANIA, A CORPORATION OF PENNSYLVANIA

APPARATUS FOR CONVEYING POWDERED MATERIALS IN PIPES

Application filed October 29, 1925, Serial No. 65,652, and in France September 24, 1925.

This invention relates to a method of and apparatus for conveying powdered materials in pipes.

It is known that dry powdered materials are very difficult to get compact. This is due to the fact that a considerable amount of air is imprisoned between the constituent grains especially when finely ground; and the finer these are the greater their mobility.

This property has been utilized to facilitate the discharge of powdered materials from storage receptacles or silos containing same. In fact, all that is necessary is to inject air near the outlet aperture and such materials will flow almost as readily as water.

There have already been designed apparatus, based on this principle, in which the materials are propelled by mechanical pressure, air being injected at a given point of the apparatus, situated in front of the mechanical pressure means. In such apparatus the material is tightly pressed prior to the admission of the air; and the sole purpose of the injection is to render the material mobile and to facilitate its transportation under the influence of the mechanical pressure.

These apparatus present the great inconvenience of requiring a considerable amount of motive power by reason of the fact that the propulsive member, worm or other, works in a material which is devoid of air and is tightly compressed.

A large proportion of the power absorbed is expended in overcoming the friction of the members in said compact material, and only a small amount is utilized for the mechanical propulsion of the material rendered mobile by the injection of a small quantity of air.

The object of the present invention is to remedy these drawbacks and to dispense entirely with mechanical propulsion.

According to this invention, the method consists in mixing with the crude powdered material a suitable quantity of air under pressure, and then allowing said air to expand more or less suddenly. In consequence, the air drives the material ahead, carrying it along, and plays the dual role of propelling agent and "fluidifier."

For example, if, in a conduit closed at one end, a powdered material and air under pressure be admitted at the closed end, said air will expand in the interior of the tube and will carry the powdered material along with it to the discharge orifice.

The volume of the air, however, will increase, as it expands, in relation to the volume of the material which remains unaltered.

Under these conditions there arrives a moment when the material can no longer retain, between its grains, the whole of the injected air; so that, while remaining mobile, it tends to separate from the surplus air and no longer travels at the same rate as the latter. To remedy this inconvenience, all that is necessary is to provide a conveyor tube the sectional area of which decreases progressively towards the discharge orifice, that is to say, in proportion as the air expands. In this manner, contrary to what happens in the case of mechanical propulsion, the materials will be carried at increasing velocity towards the outlet of the tube, compressed air will be economized, and the distance traversed can be increased without having to employ a relay.

The conveyor tube may be charged with its mixture of air and material at the dispatching station by any suitable means. Said charging means may be continuous in action (if the material retains air well) or the charging may be effected in successive quantities of air and material (if the material retains air badly).

A charging system of this kind is employed in the apparatus illustrated as an example of the application of the method just described. There could be no better way of explaining the principle of the first of these apparatus than by comparing it with a revolver, the conveyor tube representing the barrel, and the charging device the cylinder of that weapon.

In place of a cartridge the powdered material to be conveyed is introduced into the chamber of the cylinder, and the chamber made substantially air tight by the cheeks between which the cylinder revolves. If air under pressure be injected into the powdered material contained in the chamber before the latter arrives in position in line with the barrel, this air will mix with the powder and occupy the whole of the space left free between the grains thereof.

When the chamber which has been charged in this manner comes into line with the tube, said air expands instantaneously and carries the powdered material into the conveyor tube. Owing to the velocity acquired by the grains of powdered material, the chamber, unless of excessive length will be completely emptied. The cylinder revolving in front of the intake end of the tube may also be replaced by compartments describing a continuous or alternating movement in front of said intake end.

In the event of any back pressure prevailing in the tube, and as the cylinder revolves rapidly, the expansion will leave in the chamber an air pressure that is slightly below the back pressure in question. This air, under reduced pressure, is not lost, however, but may, as will be hereinafter described, be utilized for loosening the material contained in the storage bin.

This system of conveying requires air at a slightly higher pressure than the systems of conveying by mechanical propulsion; but this difference is insignificant from the point of view of the power absorbed, since the volume of air is measured exactly by the chamber or cell, and that not a fraction of it is wasted.

The air pressure should be adjusted so as to discharge the chamber to a sufficient extent. The back pressure in the conveyor tube will depend on the length of the tube and on the material conveyed.

The injection of air into the chamber should also be under control. In the case of materials which do not readily allow the air to penetrate in between their constituent grains, the injection should be effected some time prior to the discharge, and may even be continued for part of the time the discharge is in progress. The advancement or retardation, in relation to the discharge may even be modified while the discharge is proceeding. It will also depend on the delivery output and the rotational speed of the cylinder.

The accompanying drawings illustrate, diagrammatically, a typical apparatus arranged on the lines indicated above.

Fig. 1 represents a transverse section of an apparatus of this kind, taken in the plane of the line I—I of Fig. 2.

Fig. 2 represents a longitudinal section of the same.

Fig. 3 represents a transverse section of a modified form of the apparatus.

Fig. 4 represents another embodiment of the apparatus.

Fig. 5 represents still another embodiment of the apparatus, in which a member is provided with a movement of translation.

In Figs. 1 and 2 the vane wheel A plays the part of the cylinder, and is mounted in the casing B which forms the base of the storage bin S. The conveyor tube into which the material is to be delivered is represented at C.

The vanes of the wheel situated at 1, 2 and 3, fill up with the material in the storage bin S. The rotation of the wheel carries them successively into the position 4, and then to 5 where the compressed air arriving through the central tube H is injected through apertures O provided in each cell, and which, at this point, are uncovered by the rotatably adjustable valve E.

When the cell reaches position 6 it is charged under full pressure and will begin to expand as soon as the vane D uncovers the mouth of the delivery tube C.

In position 7 the cell has discharged the whole of its contents into the delivery tube and now contains nothing but air under a slightly lower pressure than that prevailing at the intake of the delivery tube. The conditions are the same in position 8; but as soon as the vane D has moved beyond the edge F and thereby opened up communication between the cell 8 and the storage bin, this air will escape into the silo and mix with the material contained therein, with the result that said material is rendered fluid and therefore will more quickly fill the cells.

In a second apparatus, which also enables the method described to be carried into effect, instead of the various cells of the distributor being charged with the powdered material first, and the compressed air afterwards (the latter being produced by a suitable machine and admitted from a special conduit), the cells of this distributor are charged with air and powdered material. This distributor is actuated in such a way that the cubical capacity of its compartments or cells diminishes between the moment when it is charged with material and the moment when it discharges the same into the conveyor tube. Consequently, the air which was under about atmospheric pressure at the outset will be under a higher pressure when it reaches the intake of the conveyor tube.

Hence, at that moment, the conditions will be the same as with the preceding apparatus, that is to say, the cell will contain a mixture of powdered material and of air, under pressure, which will expand in the conveyor tube.

It should be noted that the minimum cubical capacity of the cell, that is, the capacity at the moment of expansion, should be slightly greater than the volume of the stacked (slightly compact) powdered material (assumed to contain the smallest amount of air).

In fact, it should be remembered that the process is based essentially on the fact that the material itself is not subjected to any mechanical pressure. It is the air alone that should be compressed and it is therefore necessary that the minimum volume of the cell should be slightly in excess of that of the material in stacked condition.

It is evident that numerous forms of apparatus operating in this manner could be designed. By way of example an embodiment of this kind is illustrated in Figure 3 which shows a cross section of the apparatus. Thus, as can be seen from the drawing, the apparatus shown is composed of a stator B, connected to a suitable hopper S. Inside the stator revolves an eccentrically mounted rotor A, composed of a hub in which are adapted to slide a number of blades or plates K, the edges of which scrape against the inner walls of the stator. This is a well known device employed in rotary compressors or pumps. The conveyor tube C opens opposite a suitable point of the stator, this point approximately corresponding to the maximum of compression.

The working of this apparatus will be self evident. The material contained in the hopper S is mixed, as has already been stated, with the residual air supplied by the cells after having discharged their contents into the conveyor tube. This residual air and powdered material enters the cell which occupies the position 1 in a semisaturated state therefore does not solidly fill the cell, and the cubical capacity of this cell diminishes when it reaches the positions 2 and 3. At the end of the period 3 the cell passes in front of the tube C, and the air, which is now strongly compressed, projects the material into the tube and transports it to the outlet. At 4, the cell contains nothing but the residual air which is returned to the hopper as soon as the blade K has passed the edge F.

The form shown in Fig. 4 discloses blades K, and the hub provided with projections R on which are pivoted at U, the flaps T, the movement of which is restricted, in the opening direction, by suitable stops. These flaps are arranged in such a way that they do not come in contact with the wall of the stator except in the position 3.

As can be seen from Figure 4, the distance between the edge of the blade K and that of the flap T is approximately equal to the diameter of the intake aperture of the conveyor tube C. Hence, between the moment when one of the cells has finished discharging its contents into the tube C, and the moment when the next cell begins to discharge, there is a dead interval due to the passage of that portion of the cell which is comprised between the blade K and the flap T.

This stagnant period prevents the air and material that have been discharged into the tube C from the cell 3 from entering the cell 4 which has just emptied.

In the form shown in Fig. 5 the member is endowed with a movement of translation and consists of a conveyor A moving in relation to a structure B.

The conveyor A is provided with pistons or partitions D which divide it into successive compartments. At a point in the path of the conveyor, an aperture O discharges compressed air from a supply pipe H. The conveyor tube C opens a little further along in the same direction.

The materials arrive from the hopper S into a compartment of the conveyor, and then, in proportion as the conveyor travels, compressed air is admitted into said compartment by way of the aperture O, and the mixture of compressed air and material escapes into the tube C. This will be evident from a simple examination of the figure; and, moreover, the working of the arrangement is similar to that of Fig. 1, except that the cellular rotor A is replaced by the partitioned conveyor A.

An adjustable slide $H^1$ enables the duration and timing of the admission of compressed air to be controlled.

The admission of compressed air may be timed in such a way that it takes place only at the moment where the position of the cell is already in line with the conveyor tube C.

While we have described our invention in connection with conveying powdered materials, we wish it understood that the apparatus is also well adapted for use in elevating grain and the like.

What we claim is:—

1. An apparatus of the type described comprising in combination, a casing, conveying means including a series of walls forming chambers therebtween and having oppositely disposed openings and ports for said chambers, a feed hopper associated with said openings for admitting the material to the chambers, an angularly movable device disposed in said means arranged to coact with said ports for successively supplying a gaseous medium under high pressure to said chambers, a discharge pipe associated with the said feed hopper and arranged in position to communicate with the openings as they are brought into register therewith, and a conduit connected with the discharge pipe for allowing the rapid expansion of the materials supplied thereto and for conducting the materials away therefrom.

2. An apparatus of the type described comprising in combination, a casing, conveying means including a series of walls forming chambers therebetween and having oppositely disposed openings and ports for said chambers, a feed hopper associated with said openings for admitting the material to the chambers, an angularly movable device disposed in said means arranged to coact with said ports for successively supplying a gaseous medium under high pressure to the chambers, a discharge pipe oppositely disposed to said feed hopper and arranged in position to communicate with the openings as they are brought into register therewith, and a conduit connected with the discharge pipe for allowing the rapid expansion and subsequent progressive reduction in volume of the high pressure mixture supplied thereto and for conducting the materials away therefrom.

3. An apparatus of the type described comprising in combination, a casing, a feed hopper in said casing, a discharge pipe connected with the casing and oppositely disposed to said feed hopper, a cellular member in the casing, means for moving said cellular member with respect to said hopper and discharge pipe, an angularly adjustable device in the cellular member adapted to successively supply the cells of said movable device with a gaseous medium under pressure, and a conduit connected with the discharge pipe for allowing the rapid expansion of the materials supplied thereto and for conducting the materials away therefrom.

4. An apparatus of the type described comprising in combination, a casing, a feed hopper in said casing, a discharge pipe in the casing and oppositely disposed to said feed hopper, a rotatable wheel in the casing, a plurality of walled chambers formed in said wheel and adapted to pass before the hopper and discharge pipe successively, a hollow hub for said wheel, air inlet openings formed in said hub and communicating with said chambers, an angularly adjustable device disposed in said hub and adapted to register with said openings in the hub for supplying the chambers with a gaseous medium under pressure, and a conduit connected with the discharge pipe for allowing the rapid expansion of the materials supplied thereto and for conducting the materials away therefrom.

5. An apparatus of the type described comprising in combination, a casing, a feed hopper in said casing, a discharge pipe in the casing and oppositely disposed to said feed hopper, a rotatable wheel in the casing, a plurality of walled chambers formed in said wheel and adapted to pass before said hopper and discharge pipe successively, a hollow hub for the wheel, a plurality of air inlet openings formed in said hub and communicating with said chambers, a hollow adjustable shaft for the hub, an opening in said shaft adapted to register with the openings in the hub for supplying the chambers with a gaseous medium under pressure, and a conduit connected with the discharge pipe for allowing the rapid expansion of the materials supplied thereto and for conducting the materials away therefrom.

In testimony whereof we affix our signatures.

IVAN EMILE LANHOFFER.
EDMOND LANHOFFER.